United States Patent [19]
Morita et al.

[11] Patent Number: 6,021,989
[45] Date of Patent: Feb. 8, 2000

[54] SWIVEL ASSEMBLY OF A VEHICLE SEAT

[75] Inventors: Shinji Morita, Toyoake; Koichi Yamamoto; Takahiro Sugama, both of Kariya; Hisayoshi Kato, Toyoake; Kyoji Inoue, Chita-gun; Teruhiko Oshima, Anjo, all of Japan

[73] Assignee: Toyota Shatai Kabushiki Kaisha, Kariya, Japan

[21] Appl. No.: 08/990,537

[22] Filed: Dec. 15, 1997

[30] Foreign Application Priority Data

Dec. 16, 1996 [JP] Japan .................................... 8-359544
Oct. 27, 1997 [JP] Japan .................................... 9-311102

[51] Int. Cl.[7] .................................................. A47B 91/00
[52] U.S. Cl. .................................. 248/349.1; 297/344.26
[58] Field of Search ..................... 297/344.26, 344.21, 297/344.22, 463.1; 248/415, 349.1, 425, 188.1

[56] References Cited

U.S. PATENT DOCUMENTS

| | | |
|---|---|---|
| 2,738,245 | 3/1956 | Campbell . |
| 3,063,714 | 11/1962 | Krauss ................................. 248/415 X |
| 3,659,895 | 5/1972 | Dresden . |
| 5,110,181 | 5/1992 | Simjian . |
| 5,810,441 | 9/1998 | Ezuka et al. ....................... 297/344.26 |

FOREIGN PATENT DOCUMENTS

| | | |
|---|---|---|
| 0 515 275 | 11/1992 | European Pat. Off. . |
| 0 812 722 | 12/1997 | European Pat. Off. . |
| 6-87364 | 3/1994 | Japan . |
| 8-11600 | 1/1996 | Japan . |

OTHER PUBLICATIONS

Patent Abstracts of Japan vol. 096, No. 005, May 31, 1996 & JP 08 011600 A (Aisin Seiki Co Ltd), Jan. 16, 1996.

*Primary Examiner*—Milton Nelson, Jr.
*Attorney, Agent, or Firm*—Pillsbury Madison & Sutro LLP

[57] ABSTRACT

A swivel assembly of a vehicle seat including a ring-shaped upper plate fixed to a seat side member of a vehicle; a ring-shaped lower plate fixed to a floor side member of the vehicle; and a set plate holding the upper plate between it and the lower plate. One ball is provided between the upper plate and the lower plate. The other ball is provided between the upper plate and the set plate. The other ball is in contact with both inner surfaces of each of one sectionally V-shaped guide groove and the other sectionally V-shaped guide groove confronting the one groove. The upper plate can be held at a predetermined position without being loosened vertically and horizontally even though the upper plate, the lower plate, and the set plate have errors occurred in manufacture.

16 Claims, 17 Drawing Sheets

(A) (B)

6,021,989

SWIVEL ASSEMBLY OF A VEHICLE SEAT

CROSS-REFERENCE TO RELATED APPLICATIONS

This application is related to Japanese Patent Application Nos.Hei 8-359544 and Hei 9-311102, incorporated herein by reference.

BACKGROUND OF THE INVENTION

1. Field of the Invention

The present invention relates to a swivel assembly of a vehicle seat, and more particularly to a swivel assembly which is not loosened during swivel thereof due to size errors or the like occured in manufacture and which places an upper plate at a predetermined position reliably.

2. Description of Related Art

Recently, a swivel assembly allowing a front seat to be swiveled to confront a rear seat is adopted in one box cars or the like. Examples of the swivel assembly of a vehicle seat are described below. The one disclosed in Patent Publication Hei8-11600 is described below as a first conventional swivel assembly with reference to FIG. 32. The ring-shaped lower plate 1A L-shaped in section is fixed to a floor side member such as a seat track or the like. The sliding portion 11A inverted U-shaped in section is formed at the top of the vertical wall of the lower plate 1A. The ring-shaped upper plate 2A U-shaped in section is fixed to a seat side member such as a seat cushion frame or the like. The upper plate 2A is bent downward to form the corner 21A at its inner circumferential end. The ball 3A is held between the corner 21A and the inclined surface of the sliding portion 11A to support the upper plate 2A rotatably on the lower plate 1A. The bracket 4A having the slidable portion 41A U-shaped in section is fixed to the upper plate 2A. The slidable portion 41A of the bracket 4A is slidably installed on the sliding portion 11A of the lower plate 1A through the resinous member 5A.

The swivel assembly disclosed in Japanese Patent Publication Hei No. 6-87364 is described below as a second conventional swivel assembly with reference to FIG. 33. The ring-shaped lower plate 1B fixed to a floor side member is bent to form the first corner 13B on the inner circumferential portion 11B bent upward. The upper plate 2B fixed to a seat side member is bent to form the second corner 23B confronting the first corner 13B, and the third corner 24B on the inner and outer sides of the inner circumferential portion 21B bent upward. The ball 3B is held between the first corner 13B and the second corner 23B to support the upper plate 2B rotatably on the lower plate 1B. The ring-shaped set plate 4B is fixed to the inner circumferential portion 11B of the lower plate 1B. The outer circumferential end of the set plate 4B is bent downward to form a fourth corner 44B confronting the third corner 24B. The ball 5B is held between the third corner 24B and the fourth corner 44B.

In the first conventional swivel assembly, the ball 3A is held between the corner 21A and the inclined surface of the sliding portion 11A to place the upper plate 2A in position and prevent the upper plate 2A from being loosened. However, the load of the seat is applied to the ball 3A through the upper plate 2A. Thus, the inclined surface of the sliding portion 11A is worn with the use of the seat. As a result, the upper plate 2A drops and the resin member 5A separates from the inner circumferential surface of the sliding portion 11A and consequently, the upper plate 2A is loosened vertically.

In the second conventional swivel assembly, the ball 3B held between the first corner 13B and the second corner 23B receives the load of the seat through the upper plate 2B, and the upper plate 2B is placed in position and prevented from being loosened vertically by means of the cooperation of the ball 3B, the first corner 13B, and the second corner 23B, and the cooperation of the ball 5B, the third corner 24B, and the fourth corner 44B. However, the vertical walls forming the first through fourth corners 13B, 23B, 24B, and 44B are likely to have errors occured in press molding, thus forming clearances between the ball 3B and the vertical walls of the first and second corners 13B and 23B and between the ball 5B and the vertical walls of the third and fourth corners 24B and 44B, which causes the upper plate 2B to be horizontally loosened. Further, because the load of the seat is received by the ball 3B positioned distant from the load-applied side, the upper plate 2B is liable to be deformed and the swivel assembly has a disadvantage in its strength. In addition, the load-applied side of the upper plate 2B drops with respect to the ball 3B owing to the load of the seat caused by the deformation of the upper plate 2B. Consequently, a clearance is formed vertically between the ball 5B and the third corner 24B as well as the fourth corner 44B, thus causing the upper plate 2B to be loosened vertically.

SUMMARY OF THE INVENTION

Accordingly, it is an object of the present invention to provide a swivel assembly of a vehicle seat capable of placing a seat of the vehicle in position reliably without being loosened and having a sufficient mechanical strength.

It is another object of the present invention to provide a swivel assembly of a vehicle seat in which a rotation operation torque can be set appropriately.

In order to achieve the object, there is provided a swivel assembly of a vehicle seat comprising a ring-shaped upper plate fixed to a seat side member of a vehicle; a ring-shaped lower plate fixed to a floor side member of the vehicle; a set plate holding the upper plate between the set plate and the lower plate; a first resistance-reducing member interposed between the upper plate and the lower plate and reducing a frictional resistance of each of the upper plate and the lower plate; and a second resistance-reducing member interposed between the upper plate and the set plate and reducing the frictional resistance of each of the upper plate and the set plate. In this construction, the first resistance-reducing member and the second resistance-reducing member are located at a certain interval in a radial direction of the swivel assembly so that the first resistance-reducing member positioned at a seat load-applied side receives a load of a seat applied from the upper plate; and the second resistance-reducing member places the upper plate at a predetermined position without the upper plate being loosened.

According to the present invention, because the function of receiving the load of the seat and the positioning function are provided at separate positions, the load of the seat is not directly applied to the part having the positioning function. Thus, there is no possibility that components parts constituting the swivel assembly are worn and the plates or the swivel assembly is loosened. Further, the first resistance-reducing member for receiving the load of the seat is positioned at the seat load-applied side, it is possible to prevent the upper plate from being deformed. Thus, the swivel assembly has a high degree of mechanical strength. Further, when the load-applied side of the upper plate drops with respect to the first resistance-reducing member owing to the deformation of the upper plate caused by the application of the load of the seat, the side of the upper plate at which the second resistance-reducing member is positioned, namely, the side opposite to the load-applied side is increased in height, thus reducing the interval between the set plate and the upper plate. Consequently, the generation of gaps and looseness can be prevented in a vertical direction.

The second resistance-reducing member may be fixed to the upper plate or the set plate. This construction provides the above-described operation as well.

The present invention is applicable to a swivel assembly having a construction in which the lower plate is held between the upper plate and the set plate.

It is possible to provide a construction in which when the upper plate is held between the lower plate and the set plate or the lower plate is held between the upper plate and the set plate, the first resistance-reducing member and the second resistance-reducing member contact the upper plate or the lower plate at a predetermined pressure, respectively. The construction effectively prevents the swivel assembly from being loosened vertically when the upper plate rotates.

The second resistance-reducing member makes a contact with an inclined surface formed on the upper plate and/or the set plate confronting the upper plate and inclining in a radial direction of the upper plate and the set plate. In this manner, the upper plate can be held at the predetermined position. According to the construction, even though errors occur in forming the plates by molding, looseness in vertical and horizontal directions can be prevented. Thus, the seat can be placed in position. The inclined surface maybe concave or curved partly.

The inclined surface can be formed of both surfaces of a V-shaped groove. The construction allows a ball used as a resistance-reducing member to be held in position in assembling the swivel assembly in addition to the operation described above. As the resistance-reducing member, a resinous ring or the like can be used in addition to the ball. The balls are made of metal or resin. When the resinous ring or the ball made of resin contacts the upper plate, it effectively prevents the upper plate from being loosened in vertical and horizontal directions during rotation of the upper plate, owing to its elastic force.

Preferably, a swivel assembly of a vehicle seat of the present invention comprises a ring-shaped upper plate fixed to a seat side member of a vehicle; a ring-shaped lower plate fixed to a floor side member of the vehicle; and a set plate holding the upper plate between the set plate and the lower plate. Further, an interval-altering part for adjustably altering an interval between the lower plate and the set plate when the interval-altering part is deformed is formed at a connection portion connecting the lower plate and the set plate.

The interval-altering part may be composed of a boss, a projection or a collar wall formed at one side of the lower plate or the set plate and projecting to the other side thereof in a predetermined height. The interval between the lower plate and the set plate is adjusted and the force for holding the upper plate between the set plate and the lower plate is also adjusted by plastically deforming the boss or the like to reduce the height of the boss or the like. In this manner, the torque for swiveling the upper plate, namely, the seat can be set to an appropriate value. The construction eliminates the need for provision of a plurality of shim plates having different thicknesses used in the conventional swivel assembly, thus reducing time and labor in assembling the swivel assembly.

The interval-altering part may be composed of a plate such as a resinous plate plastically deformable by inserting it between the lower plate and the set plate or of a spring or a rubber material elastically deformable by inserting it therebetween. The interval between the lower plate and the set plate is changed to adjust the force for holding the upper plate between the set plate and the lower plate by plastically deforming the resinous plate or the like or elastically deforming the spring or the like to reduce the height thereof. In this manner, the torque for swiveling the upper plate, namely, the seat can be set to an appropriate value. The construction eliminates the need for provision of a plurality of shim plates having different thicknesses used in the conventional swivel assembly.

The present invention is applicable to a swivel assembly having a construction in which the lower plate is held between the upper plate and the set plate. In this case, the interval-adjusting part is formed at a connection portion connecting the upper plate and the set plate with each other.

BRIEF DESCRIPTION OF THE DRAWINGS

Additional objects and advantages of the present invention will be more readily apparent from the following detailed description of preferred embodiments thereof when taken together with the accompanying in which.

DETAILED DESCRIPTION OF THE PRESENTLY PREFERRED EXEMPLARY EMBODIMENTS

First Embodiment

Figure 1:
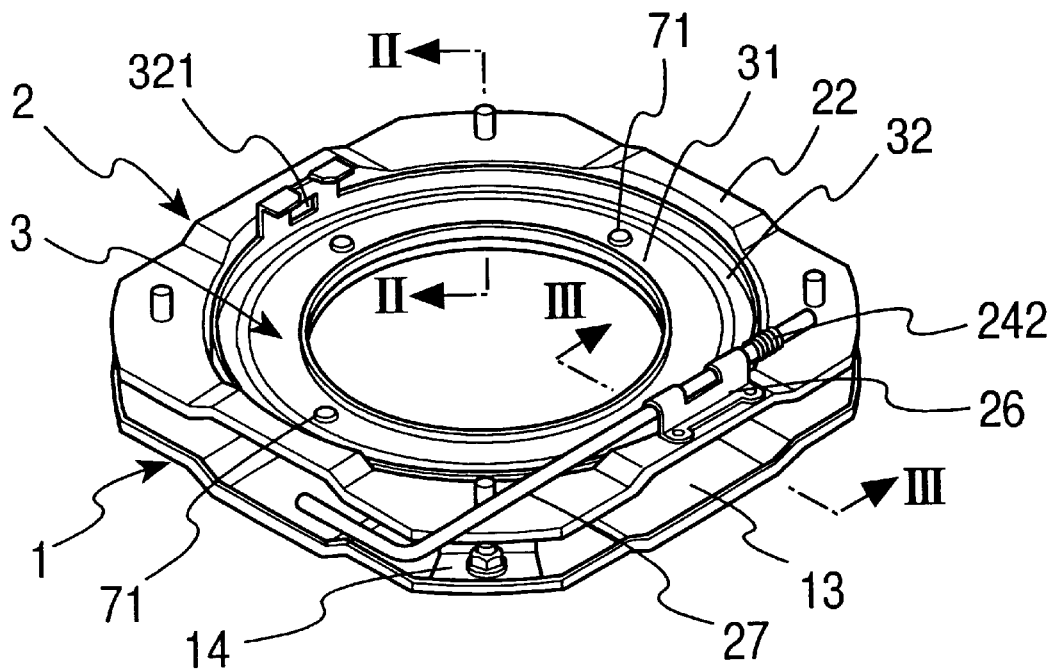
FIG. 1 is a perspective view showing an entire swivel assembly of a first embodiment of the present invention.
Figure 2:
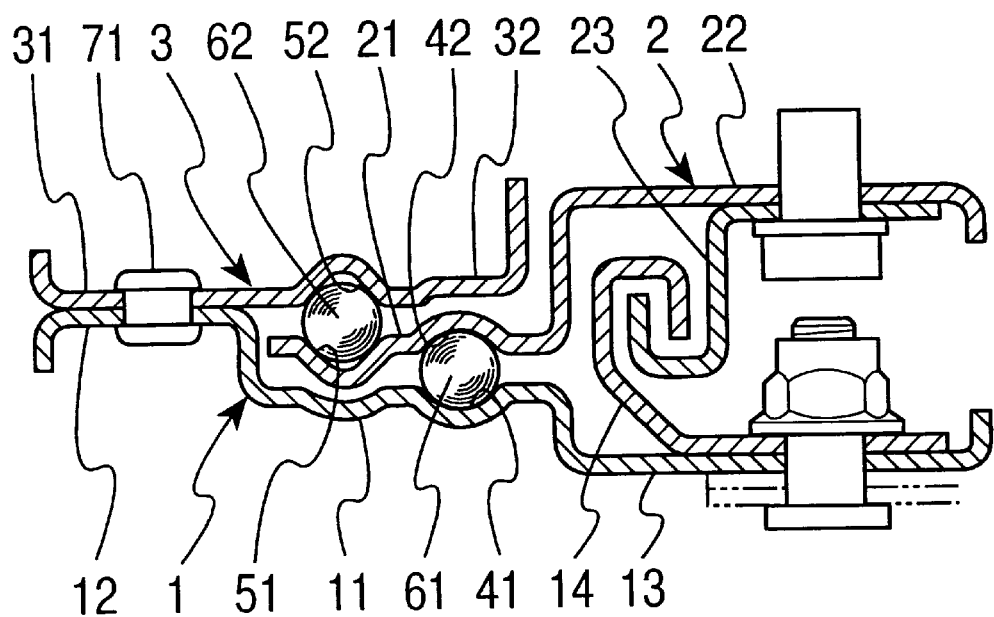
FIG. 2 is a sectional view taken along a line II—II of FIG. 1.
Figure 3:
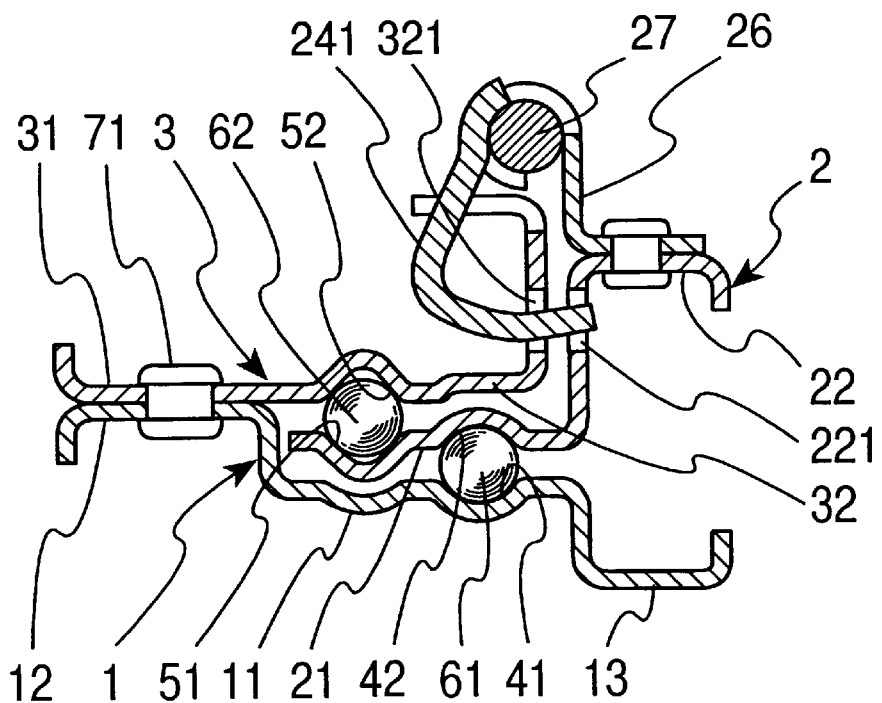
FIG. 3 is a sectional view taken along a line III—III of FIG. 1.

An example of the swivel assembly of a vehicle according to the first embodiment of the present invention will be described below with reference to FIGS. 1 through 3. FIG. 1 is a perspective view showing the entire swivel assembly. FIG. 2 is a sectional view taken along a line II—II of FIG. 1. FIG. 3 is a sectional view taken along a line III—III of FIG. 1. As shown in FIG. 1, the swivel assembly comprises a ring-shaped lower plate 1 approximately square in its outer configuration and fixed to a floor side member such as a seat track; and a ring-shaped upper plate 2 coaxial with the lower plate 1, positioned over the lower plate 1, approximately square in its outer configuration, and fixed to a seat side member such as a seat cushion frame. As shown in FIG. 2, the lower plate 1 comprises a outer circumferential part 13 fixed to the floor side member, an intermediate part 11 stepwise higher than the outer circumferential part 13, and an inner circumferential part 12 higher stepwise than the intermediate part 11. A concave guide groove 41 circular arc-shaped in section and open upward is circumferentially formed on the intermediate part 11.

The upper plate 2 comprises an outer circumferential part 22 fixed to the seat side member; an inner circumferential part 21 stepped downward from the outer circumferential part 22 and positioned over the intermediate part 11 of the lower plate 1; and a guide groove 42 circular arc-shaped in section, formed circumferentially on the upper plate 2, and open downward, thus confronting the guide groove 41. By an unshown holder, a plurality of metal balls 61 is held in the ring-shaped space formed of the guide grooves 41 and 42. The curvature of each of the guide grooves 41 and 42 is smaller than that of the ball 61. The inner circumferential part 31 of a set plate 3 is connected with the inner circumferential part 12 of the lower plate 1 by means of a caulking pin 71. The outer circumferential part 32 of the set plate 3 is positioned over the inner circumferential part 21 of the upper plate 2.

A guide groove 52 inverted V-shaped sectionally is formed circumferentially on the outer circumferential part 32 of the set plate 3. A guide groove 51 V-shaped sectionally is formed on the inner circumferential part 21 of the upper plate 2 such that the guide grooves 51 and 52 are radially coincident with each other. By an unshown holder, a plurality of metal balls 62 is held in the ring-shaped space formed of the guide grooves 51 and 52. Because the inner circumferential part 21 of the upper plate 2 is held between the set plate 3 positioned above the upper plate 2 and the lower plate 1 positioned below the upper plate 2 through the balls 61 and 62, the swivel assembly can be swiveled smoothly at a small friction resistance. A plurality of hook-shaped restriction members 14 and 23 confronting each other are mounted on the outer circumferential part 13 of the lower plate 1 and the outer circumferential part 22 of the upper plate 2, respectively to prevent the lower plate 1 and the upper plate 2 from being separated from each other in an excess amount by a tensile load applied thereto from a seat belt or the like.

Through-holes 221 and 321 are formed on the vertical wall of each of the outer circumferential part 22 of the upper plate 2 and the outer circumferential part 32 of the set plate 3. When the seat faces forward and backward, the through-holes 221 and 321 are horizontally coincident with each other. An operation shaft 27 is horizontally pivotally supported by a bracket 26 installed on the upper surface of the outer circumferential part 22 of the upper plate 2. When the seat faces forward and backward, the swivel of the seat is locked because a hook 241 mounted on the operation shaft 27 penetrates through the through-holes 221 and 321. When the operation shaft 27 is rotated, the hook 241 is removed from the through-holes 221 and 321, and thus the seat is allowed to swivel. A coil spring 242 (see FIG. 1) for urging the hook 241 into the through-holes 221 and 321 is mounted on the operation shaft 27.

The swivel assembly having the construction is assembled as follows: Initially, the lower plate 1 is set on a jig. Then, a plurality of the balls 61 held at regular intervals by the holder is placed in the guide groove 41 of the lower plate 1. Thereafter, the upper plate 2 is placed on the lower plate 1 such that the guide groove 42 of the upper plate 2 is radially coincident with the balls 61, by rotating the upper plate 2 a little to prevent the restriction member 14 of the lower plate 1 and the restriction member 23 of the upper plate 2 from interfering with each other. Then, a plurality of balls 62 held at regular intervals by the holder is placed in the guide groove 51 of the upper plate 2. Then, the set plate 3 is placed over the upper plate 2 through the ball 62 such that the guide groove 52 of the set plate 3 is radially coincident with the ball 62. Then, the inner circumferential part 31 of the set plate 3 is fixed to the inner circumferential part 12 of the lower plate 1 by means of the caulking pin 71.

Figure 4:
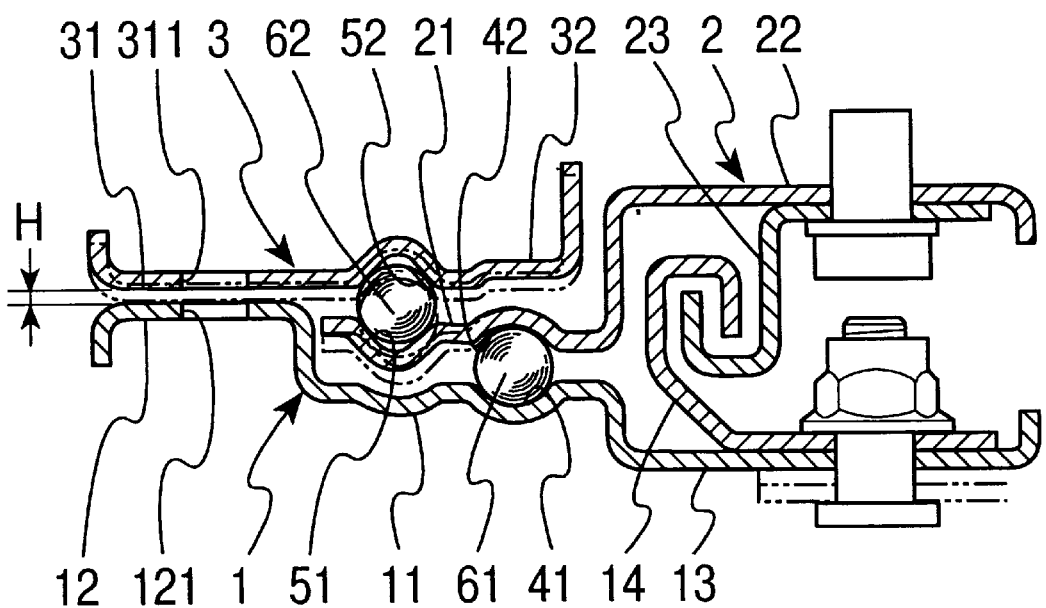
FIG. 4 is a sectional view showing the swivel assembly of the first embodiment being assembled from components parts.
Figure 5:
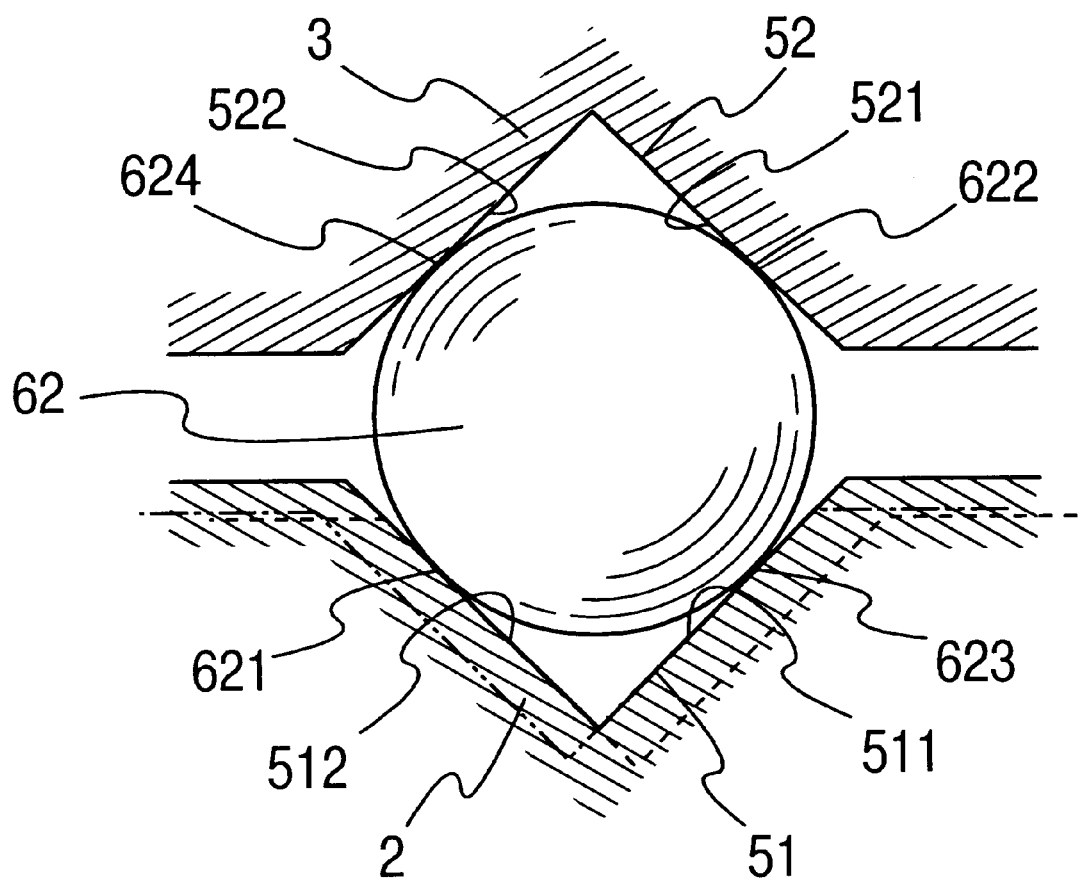
FIG. 5 is an enlarged sectional view showing a ball-sandwiching portion of the first embodiment of the present invention.

FIG. 4 is a sectional view showing the swivel assembly in a state immediately before the set plate 3 is fixed to the lower plate 1. As apparent from FIG. 4, when the set plate 3 is placed over the upper plate 2 through the ball 62, the upper end of the ball 62 is located upward from its final set position, and the set plate 3 is located above the lower plate 1 by a distance (H). In fixing the set plate 3 to the lower plate 1 by the caulking pin 71, the inner circumferential part 31 of the set plate 3 is pressed downward to bring the inner circumferential part 31 into contact with the inner circumferential part 12 of the lower plate 1, as shown by a two-dot chain line of FIG. 4. As a result, both inner surfaces of the guide groove 52 contact the surface of the ball 62, thus pressing the ball 62 downward. Consequently, the inner circumferential part 21 of the upper plate 2 is deformed elastically downward, as shown by another two-dot chain line of FIG. 4. As shown in FIG. 5, both surfaces 511 and 512 of the guide groove 51 and inclined surfaces 521 and 522 of the guide groove 52 contact the surface of the ball 62 closely at points 623, 621, 622, and 624, respectively, thus allowing the upper plate 2 to be placed at the predetermined position without the upper plate 2 being loosened vertically and horizontally. When the set plate 3 is placed over the upper plate 2 through the ball 62, a caulking hole 311 (see FIG. 4) of the set plate 3 is allowed to be vertically coincident with a caulking hole 121 of the lower plate 1, because the guide groove 52 is inverted V-shaped in section.

Errors occurred in a press molding process may cause the relative position of the guide grooves 51 and 52 to be dislocated from each other horizontally when the set plate 3 has been fixed to the lower plate 1. In this embodiment, the guide groove 51 is V-shaped in section. Thus, when the guide groove 51 is dislocated to the right relatively to the guide groove 52, the inner surface 511 of the guide groove 51 does not contact the surface of the ball 62 but the inner surface 512 contacts it at the point 621, as shown by a broken line of FIG. 5. Consequently, the load of the seat is received by the point 621 and the point 622 of the inner surface 521. On the other hand, when the guide groove 51 is dislocated leftward relatively to the guide groove 52, the inner surface 512 of the guide groove 51 does not contact the surface of the ball 62 but the inner surface 511 contacts it at the point 623, as shown by a two-dot chain line of FIG. 5. Consequently, the load of the seat is received by the point 623 and the point 624 of the inner surface 522. That is, the ball 62 closely contacts the inner surfaces 512 and 521 confronting each other horizontally (radial direction of swivel assembly) or the inner surfaces 511 and 522 confronting each other horizontally. Therefore, the upper plate 2 can be placed at the predetermined position vertically and horizontally without being loosened. The above description has been made on the supposition that the upper plate 2 is elastically deformed, but which of the upper plate 2 and set plate 3 is elastically deformed depends on the rigidity thereof. Thus, in a case, the set plate 3 is deformed and in a case, both the upper plate 2 and the set plate 3 are deformed.

Through the upper plate 2, the load of the seat is applied to the ball 61 positioned in the outer circumferential side of the swivel assembly. Thus, the deformation of the upper plate 2 can be prevented because the distance between the load-applied point and the ball 61 is short. Because the load of the seat is not applied to the ball 62, the guide groove 51 and the guide groove 52 can be prevented from being worn to a high degree and hence, the upper plate 2 can be placed in position reliably.

Further, when the load-applied side, namely, outer circumferential part 22, of the upper plate 2 drops with respect to the ball 61 owing to the deformation of the upper plate 2 caused by the application of the load of the seat, the ball-positioned side, namely, inner circumferential part 21 of the upper plate 2 is increased in height, thus reducing the interval between the set plate 3 and the inner circumferential part 21 of the upper plate 2. Consequently, the generation of gaps and looseness can be prevented in a vertical direction.

Second Embodiment

The swivel assembly of the second embodiment is described below with reference to FIGS. 6 and 7.

Figure 6:
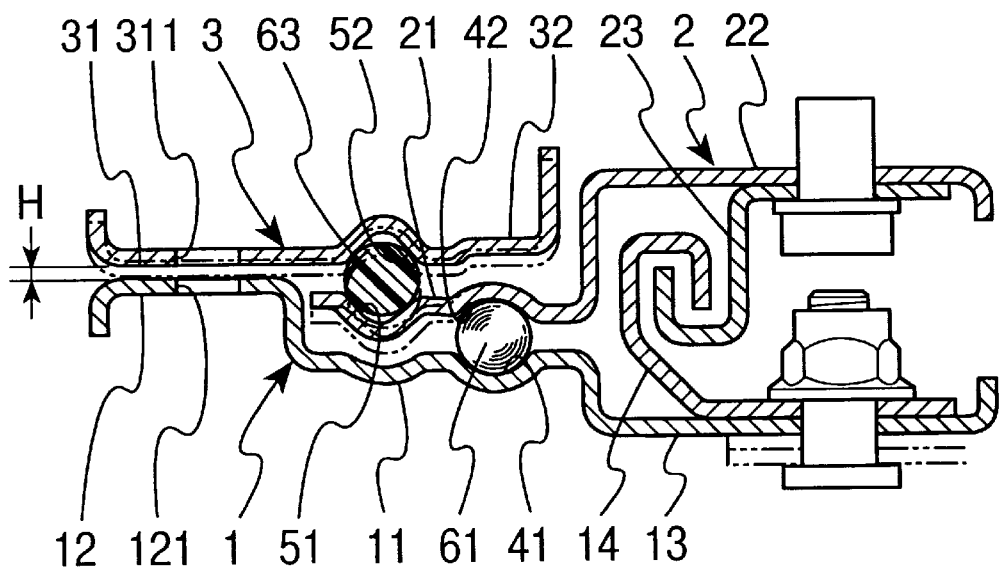
FIG. 6 is a sectional view showing a swivel assembly according to a second embodiment of the present invention.
Figure 7:
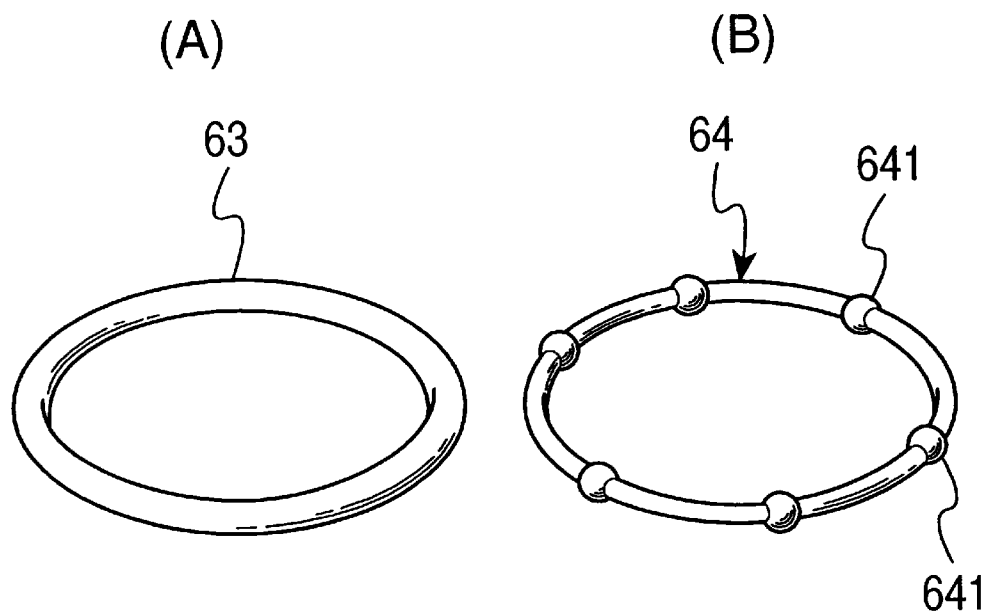
FIG. 7 is a perspective view showing a resinous ring according to the second embodiment of the present invention.

The swivel assembly of the second embodiment shown in FIG. 6 corresponds to that of the first embodiment shown in FIG. 4. A resinous ring 63 circular in section is placed in the guide groove 51 of the upper plate 2 and the guide groove 52 of the set plate 3, instead of the metal ball 62 of the first embodiment. FIG. 7A shows the shape of the resinous ring 63 elastically deformable. When the set plate 3 is fixed to the inner circumferential part 12 of the lower plate 1 by caulking, as shown by a two-dot chain line of FIG. 6, the distance (H) between the set plate 3 and the lower plate 1 is absorbed by the elastic deformation of the resinous ring 63. In this case, because the resinous ring 63 contacts the inner surfaces of each of the guide groove 51 and 52 V-shaped in section by its elastic force, without a gap formed at four contact points (two contact points each on the guide groove 51 and the guide groove 52), the upper plate 2 can be placed at the predetermined position without the upper plate 2 being loosened vertically and horizontally.

Instead of the resinous ring 63, a resinous ring 64 having a plurality of large-diameter spheres 641 formed thereon circumferentially may be used, as shown in FIG. 7B. The use of the resinous ring 64 allows the frictional resistance of the upper plate 2 to be small sufficiently during its swivel motion, in addition to the above-described effect. A resinous ball may be used instead of the resinous ring 63. It is preferable to use the metal ball 61 as shown in FIG. 6 for the guide grooves 41 and 42 to support the seat if it is comparatively heavy, but it is able to use the resinous rings 63 or 64 to support the seat when it is comparatively light.

Third Embodiment

Figure 8:
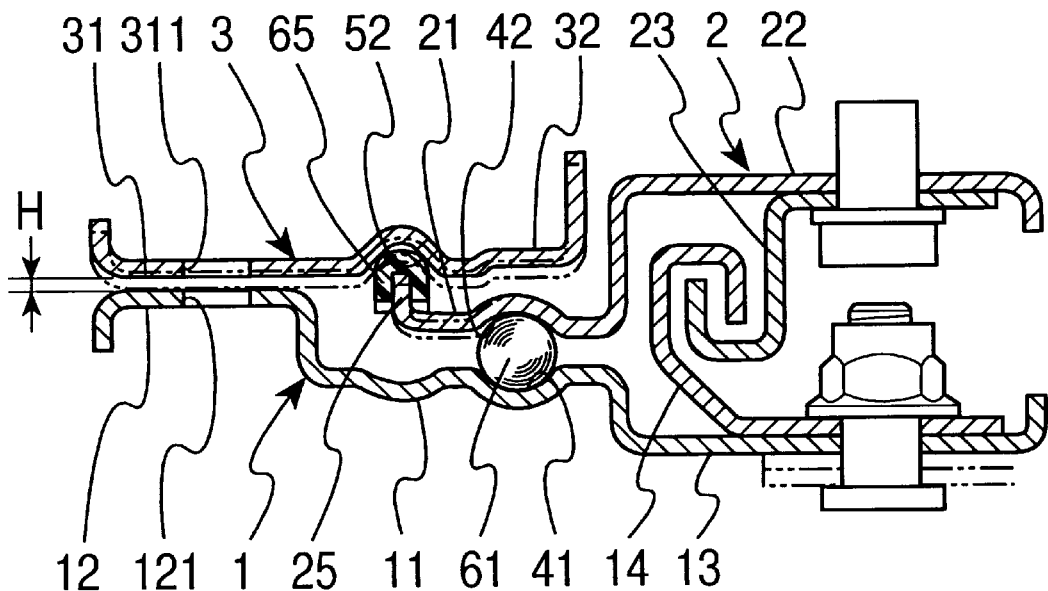
FIG. 8 is a sectional view showing a swivel assembly according to a third embodiment of the present invention.

In the swivel assembly shown in FIG. 8, the inner circumferential end of the upper plate 2 is bent upward to form a flange 25. A resinous ring 65 is fixed to the flange 25 by inserting the flange 25 into the resinous ring 65. The sectionally semicircular upper half of the resinous ring 65 is positioned in the sectionally V-shaped guide groove 52 of the set plate 3. The resinous ring 65 is elastically deformable to some extent. Thus, when the set plate 3 is fixed to the inner circumferential part 12 of the lower plate 1 by caulking, as shown by a two-dot chain line of FIG. 8, the distance (H) between the set plate 3 and the lower plate 1 is absorbed by the deformation of the resinous ring 65 and that of the outer circumferential part 32 of the set plate 3 or that of the inner circumferential part 21 of the upper plate 2. That is, the upper plate 2 can be placed at the predetermined position without the upper plate 2 being loosened vertically. At this time, because the upper half of the resinous ring 65 contacts the inner surface of the guide groove 52 at two points, without a gap generated therebetween. Thus, the upper plate 2 can be placed at the predetermined position without the upper plate 2 being loosened horizontally as well.

Fourth Embodiment

Figure 9:
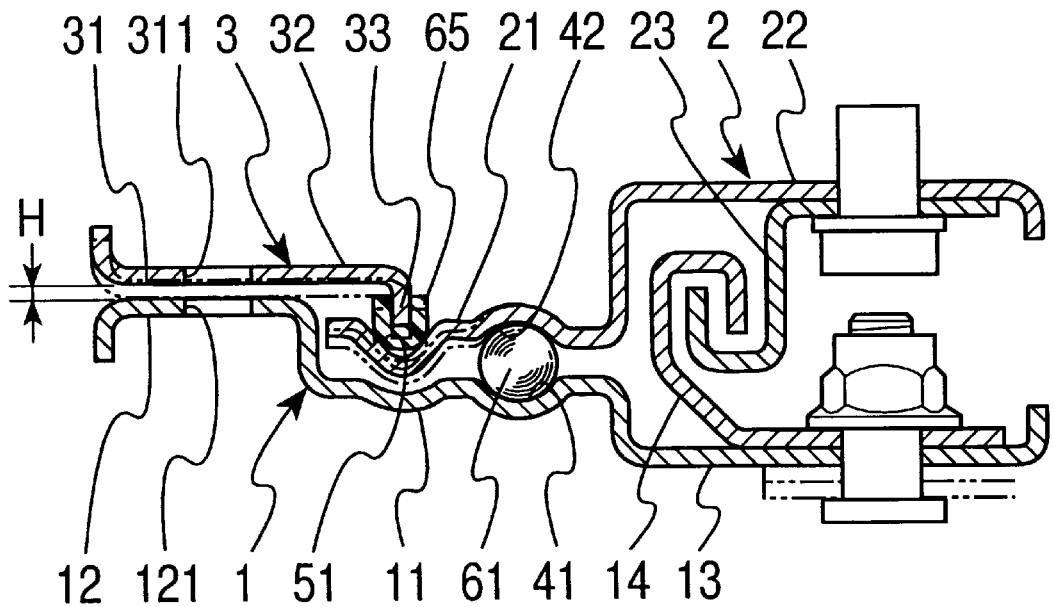
FIG. 9 is a sectional view showing a swivel assembly according to a fourth embodiment of the present invention.

In the swivel assembly of the fourth embodiment shown in FIG. 9, the inner circumferential end of the set plate 3 is bent downward to form a flange 33. The resinous ring 65 is fixed to the flange 33 by inserting the flange 33 into the resinous ring 65. The sectionally semicircular lower half of the resinous ring 65 is placed on the sectionally V-shaped guide groove 51 of the upper plate 2. The fourth embodiment provides the same effect as that of the third embodiment.

Fifth Embodiment

Figure 10:
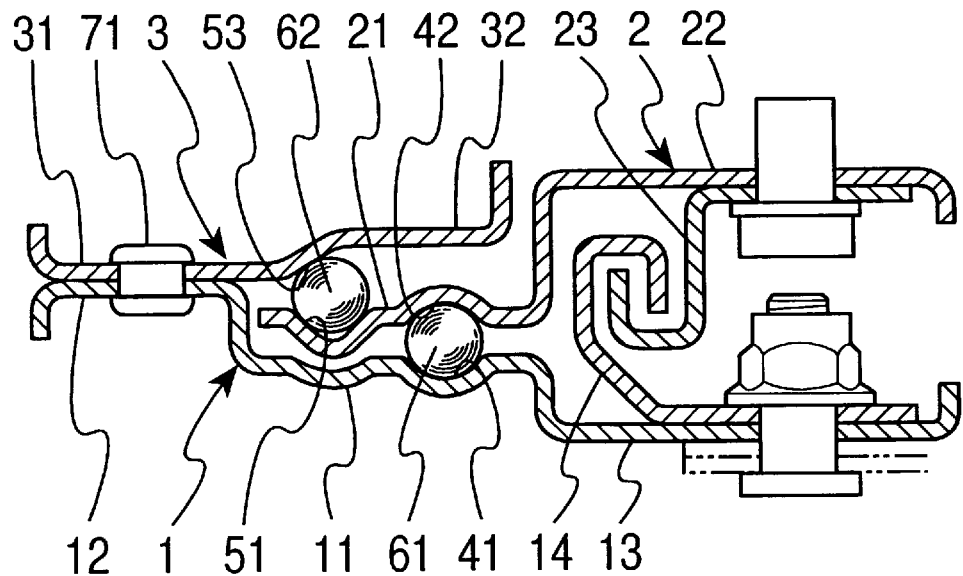
FIG. 10 is a sectional view showing a swivel assembly according to a fifth embodiment of the present invention.

In the swivel assembly of the fifth embodiment shown in FIG. 10, the region between the inner circumferential part 31 of the set plate 3 and the outer circumferential part 32 thereof is inclined upward at a certain angle to form an inclined surface 53. The metal ball 62 positioned in the guide groove 51 of the upper plate 2 contacts the inclined surface 53. The other constructions of the swivel assembly are the same as those of the swivel assembly of the first embodiment.

The construction of the swivel assembly allows both inner surfaces 511 and 512 of the guide groove 51 to contact the surface of the ball 62 at points 625 and 626 without a gap generated between the surface of the ball 62 and the inner surface 511 as well as the inclined surface 512 and also allows the surface of the ball 62 to contact the inclined surface 53 at a point 627. Consequently, the upper plate 2 can be placed at the predetermined position without the upper plate 2 being loosened vertically and horizontally.

Figure 11:
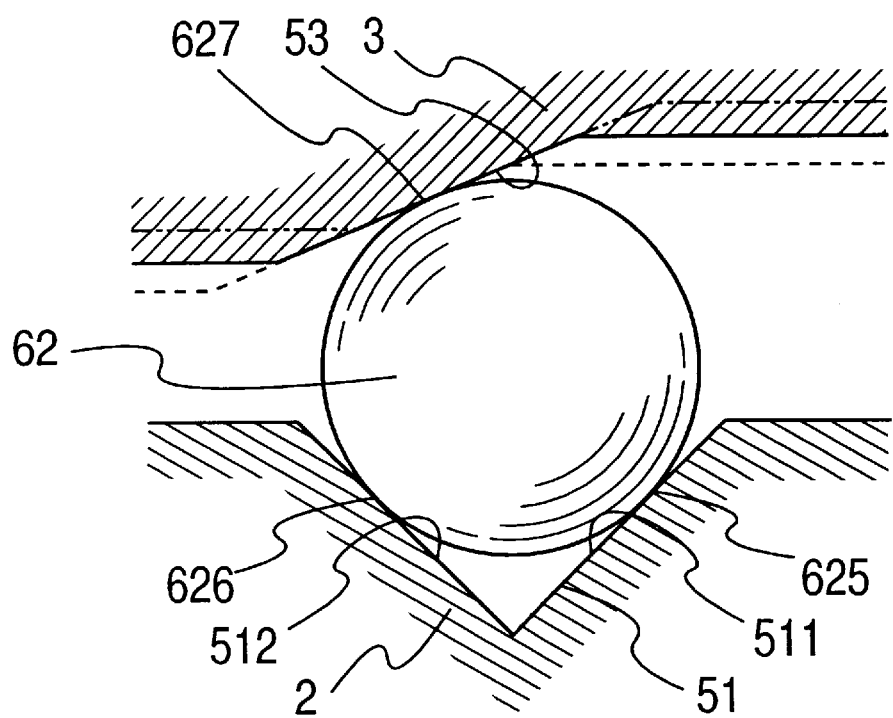
FIG. 11 is an enlarged sectional view showing a ball-sandwiching portion of the fifth embodiment of the present invention.

Errors occurred in production may cause the relative position of the inclined surface 53 and the guide groove 51 to be dislocated from each other horizontally when the set plate 3 has been fixed to the lower plate 1. If the inclined surface 53 is dislocated leftward relatively to guide groove 51, as shown by a broken line of FIG. 11, the inclined surface 53 keeps contacting the surface of the ball 62 at the point 627 because the set plate 3 is pressed downward by its elastic force. Consequently, the load of the seat is received by the point 627, the point 625 at which the inner surface 511 of the guide groove 51 and the ball 62 contact each other, and the point 626 at which the inner surface 512 of the guide groove 51 and the ball 62 contact each other. On the other hand, if the inclined surface 53 is dislocated to the right relatively to guide groove 51, as shown by a two-dot chain line of FIG. 11, the inclined surface 53 keeps contacting the surface of the ball 62 at the point 627, with the set plate 3 being pressed upward. Consequently, the load of the seat is received by the point 627 the point 625 at which the inner surface 511 of the guide groove 51 and the ball 62 contact each other, and the point 626 at which the inner surface 512 of the guide groove 51 and the ball 62 contact each other. For the reason described above, the upper plate 2 can be placed at the predetermined position vertically and horizontally without being loosened because without a gap generated, the ball 62 contacts the inclined surface 53 and the inner surface 511 confronting the inclined surface 53 horizontally (radial direction of the swivel assembly). The inclination of the inclined surface 53 may be reduced in a range in which the positioning action thereof is not prevented from being deteriorated to distribute the load of the seat to both the inner surfaces 511 and 512. In this case, the inner surfaces 511 and 512 can be prevented from being worn to a great extent.

The above description has been made on the supposition that the set plate 3 is elastically deformed, but which of the upper plate 2 and set plate 3 is elastically deformed depends on the rigidity thereof. Thus, in a case, the upper plate 2 is elastically deformed and in a case, both the upper plate 2 and the set plate 3 are elastically deformed. It is possible to replace the metal balls 61 and 62 with the resinous ring 63 described in the second embodiment.

Sixth Embodiment

Figure 12:
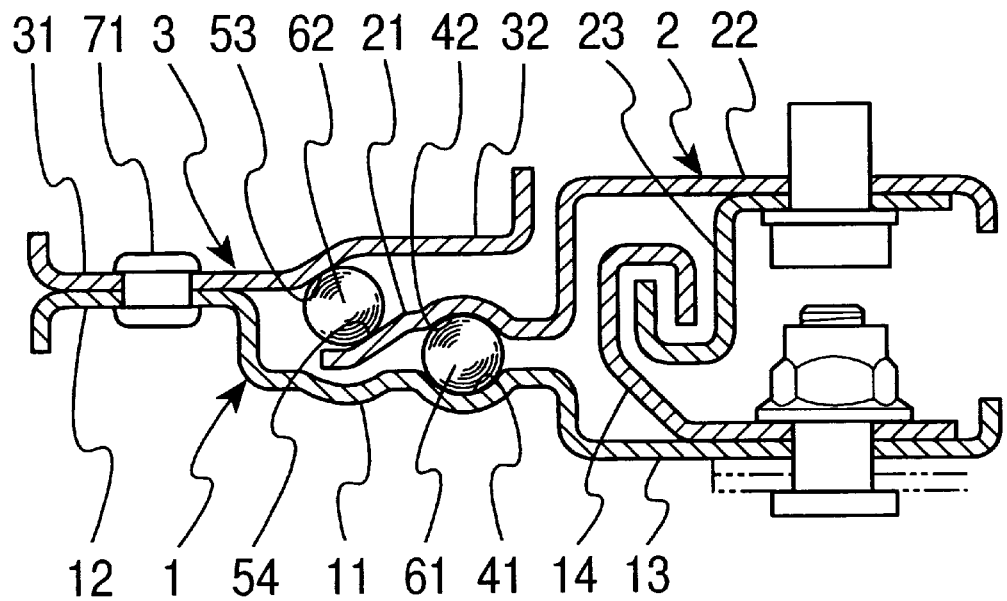
FIG. 12 is a sectional view showing a swivel assembly according to a sixth embodiment of the present invention.

In the swivel assembly of the sixth embodiment, instead of the guide groove 51 in the fifth embodiment, as shown in FIG. 12, an inclined surface 54 inclining downward toward the inner side of the swivel assembly is formed on the inner circumferential part 21 of the upper plate 2 to sandwich the ball 62 between the inclined surface 54 and the inclined surface 53 of the set plate 3. The sixth embodiment provides the same operation and effect as those of the fifth embodiment.

Seventh Embodiment

Figure 13:
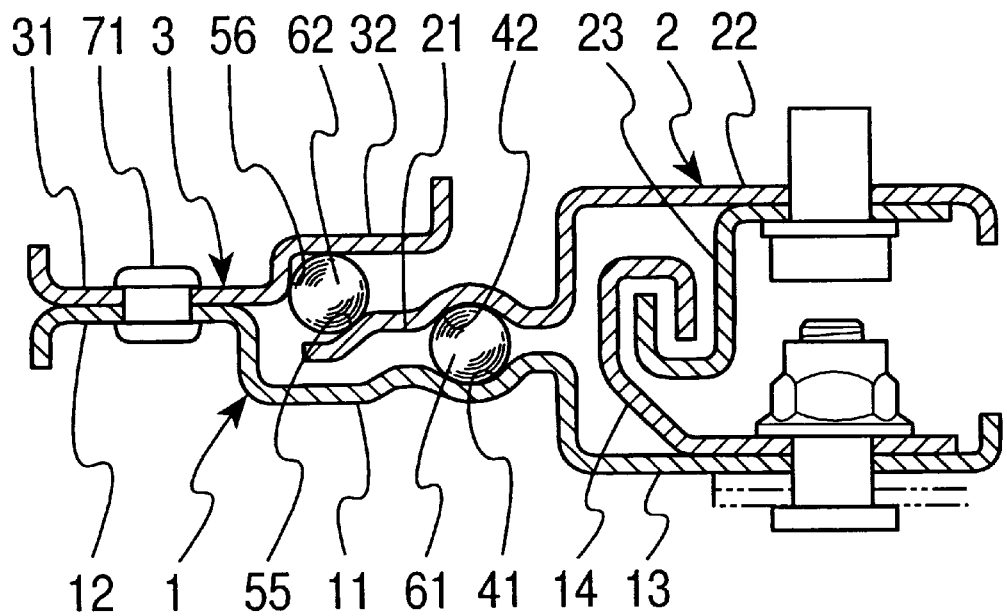
FIG. 13 is a sectional view showing a swivel assembly according to a seventh embodiment of the present invention.

In the swivel assembly of the seventh embodiment shown in FIG. 13, an inclined surface 55 inclining downward toward the inner side of the swivel assembly is formed on the inner circumferential part 21 of the upper plate 2. In addition, a vertical surface 56 is formed between the inner circumferential part 31 of the set plate 3 and the outer circumferential part 32 thereof to bring the surface of the ball 62 into contact with the inclined surface 55, the vertical surface 56, and the horizontal lower surface of the outer circumferential part 32. The seventh embodiment provides the same operation and effect as those of the fifth embodiment.

Eighth Embodiment

Figure 14:
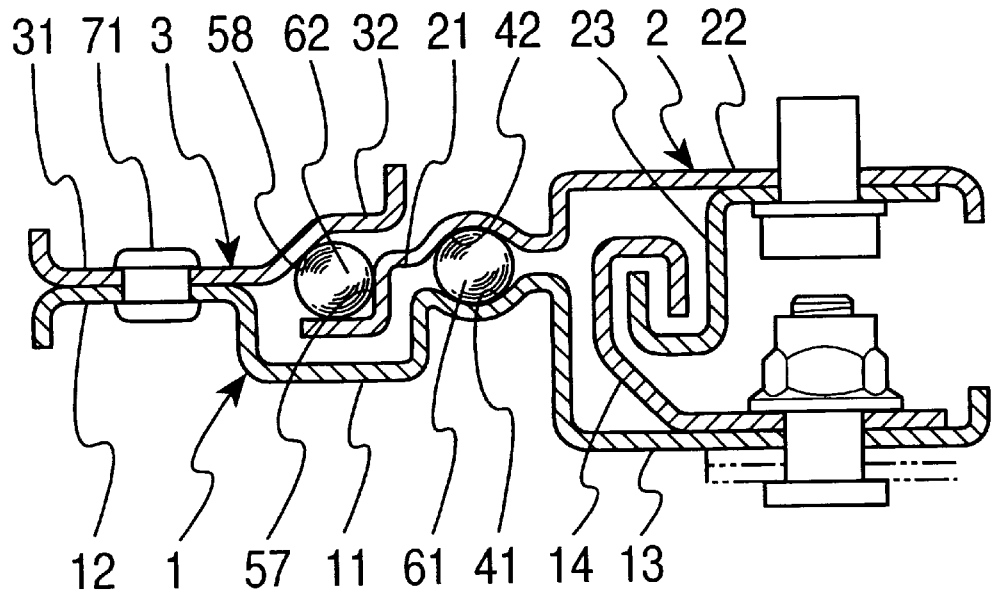
FIG. 14 is a sectional view showing a swivel assembly according to an eighth embodiment of the present invention.

In the swivel assembly of the eighth embodiment shown in FIG. 14, a vertical surface 57 is formed on the inner circumferential part 21 of the upper plate 2. In addition, an inclined surface 58 is formed between the inner circumferential part 31 of the set plate 3 and the outer circumferential part 32 thereof to bring the surface of the ball 62 into contact with the inclined surface 58, the vertical surface 57, and the horizontal upper surface of the inner circumferential part 21 of the upper plate 2. The eighth embodiment provides the same operation and effect as those of the fifth embodiment.

Ninth Embodiment

Figure 15:
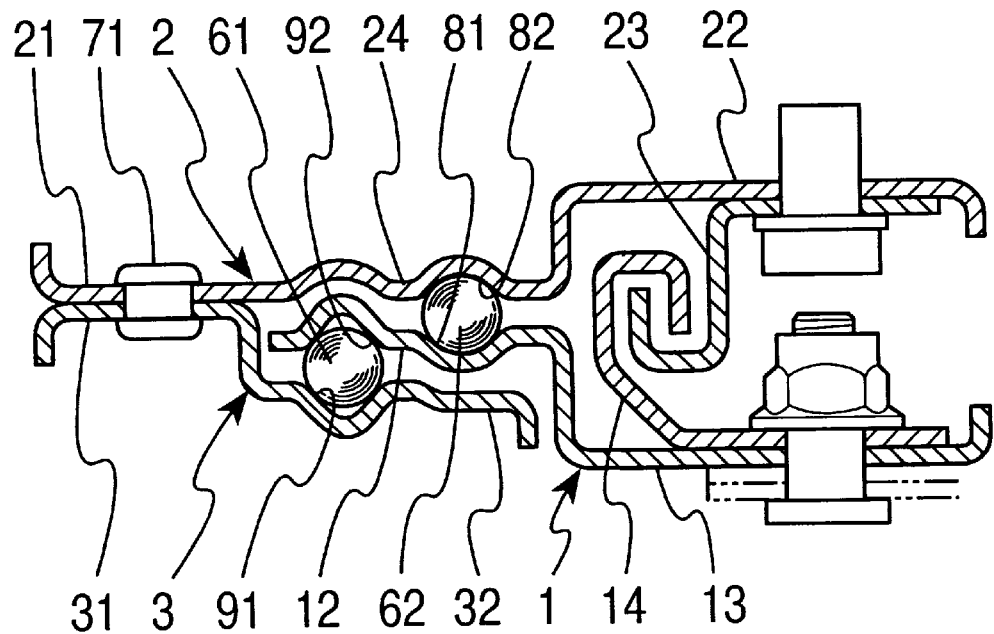
FIG. 15 is a sectional view showing a swivel assembly according to a ninth embodiment of the present invention.

The swivel assembly of the first and second embodiments of the present invention is applicable to a swivel assembly having a construction shown in FIG. 15. As shown in FIG. 15, a lower plate 1 comprises a outer circumferential part 13 fixed to a floor side member; an inner circumferential part 12 stepwise higher than the outer circumferential part 13; and a concave guide groove 81 circular arc-shaped in section, open upward, and circumferentially formed on the inner circumferential part 12.

An upper plate 2 includes a outer circumferential part 22 fixed to a seat side member; an intermediary part 24 and inner circumferential part 21 stepped downward from the outer circumferential part 22; and a guide groove 82 circular arc-shaped in section, formed circumferentially on the upper plate 2, open downward, and positioned directly over the guide groove 81. By an unshown holder, a plurality of metal balls 62 is held in the ring-shaped space formed of the guide grooves 81 and 82. The curvature of each of the guide grooves 81 and 82 is smaller than that of the ball 62. The inner circumferential part 31 of a set plate 3 is connected with the inner circumferential part 21 of the upper plate 2 by means of a caulking pin 71. The outer circumferential part 32 of the set plate 3 is positioned below the inner circumferential part 12 of the lower plate 1.

A guide groove 91 V-shaped sectionally is formed circumferentially on the outer circumferential part 32 of the set plate 3. A guide groove 92 inverted V-shaped sectionally is formed on the inner circumferential part 12 of the lower plate 1 such that the guide grooves 91 and 92 are radially coincident with each other. By an unshown holder, a plurality of metal balls 61 is held in the ring-shaped space formed of the guide grooves 91 and 92. Because the inner circumferential part 12 of the lower plate 1 is held between the upper plate 2 positioned above the lower plate 1 and the set plate 3 positioned below the lower plate 1 through the balls 61 and 62, the swivel assembly can be swiveled smoothly at a small friction resistance.

In the swivel assembly having the construction, the ball 61 closely contacts both inner surfaces of the guide groove 91 and those of the guide groove 92 without generating a gap therebetween. Therefore, the upper plate 2 can be placed at the predetermined position vertically and horizontally without the upper plate 2 being loosened. Even though the guide grooves 91 and 92 are dislocated relatively to each other horizontally when the set plate 3 has been fixed to the upper plate 2 due to errors occurred in manufacture, as described in the first embodiment, the ball 61 closely contacts the horizontally confronting inner surfaces of the guide groove 91 or those of the guide groove 92 without the ball 61 generating a gap therebetween. Therefore, the upper plate 2 can be placed at the predetermined position vertically and horizontally without being loosened.

10th Embodiment

Figure 16:
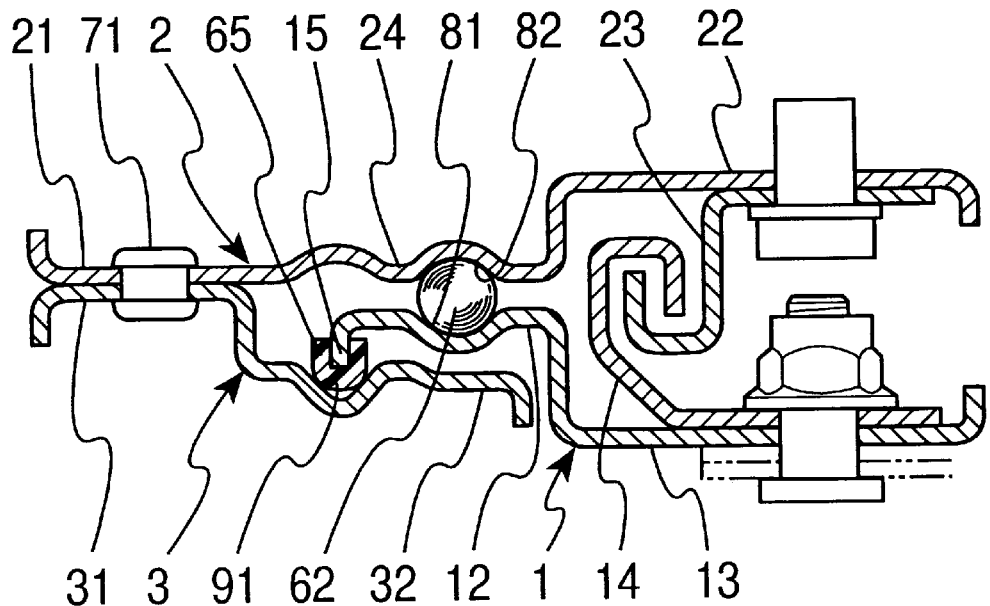
FIG. 16 is a sectional view showing a swivel assembly according to a tenth embodiment of the present invention.

The swivel assembly of the third and fourth embodiments of the present invention is applicable to the swivel assembly having a structure described in the ninth embodiment. FIG. 16 is a sectional view showing the swivel assembly of the tenth embodiment. The inner circumferential end of the lower plate 1 is bent downward to form a flange 15. A resinous ring 65 elastically deformable to some extent is fixed to the flange 15 by inserting the flange 15 into the resinous ring 65. The resinous ring 65 is positioned in the sectionally V-shaped guide groove 91 of the set plate 3. The lower half of the resinous ring 65 contacts the inner surface of the guide groove 91 at two points closely. Therefore, the upper plate 2 can be placed at the predetermined position vertically and horizontally without being loosened.

11th Embodiment

Figure 17:
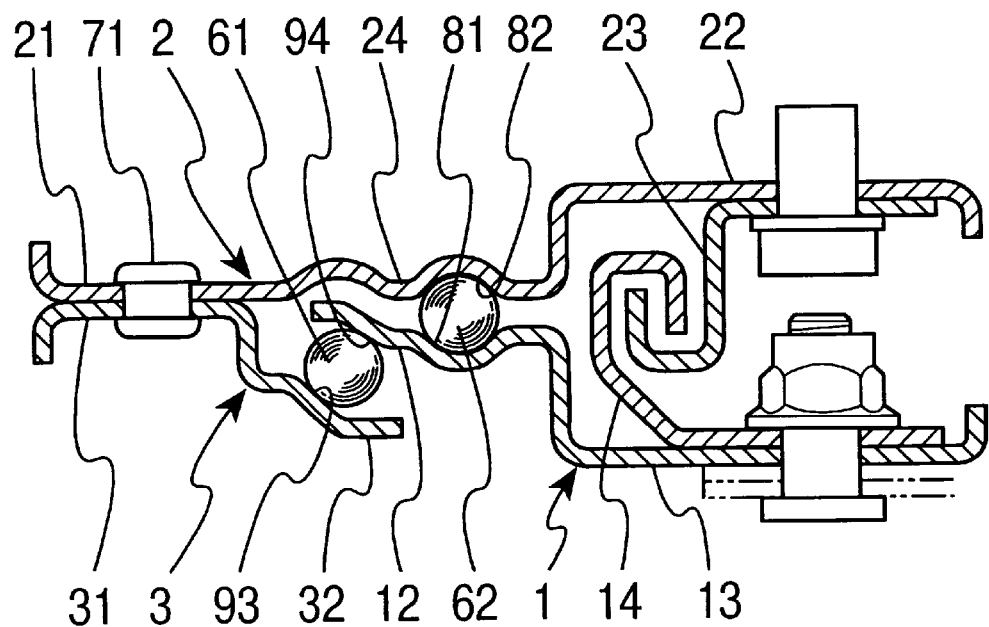
FIG. 17 is a sectional view showing a swivel assembly according to an eleventh embodiment of the present invention.

The swivel assembly of the fifth through eighth embodiments of the present invention is applicable to the swivel assembly having a structure described in the ninth embodiment. FIG. 17 is a sectional view showing the swivel assembly of the eleventh embodiment. An inclined surface 94 inclining upward toward the inner side of the swivel assembly is formed on the inner circumferential part 12 of the lower plate 1. In addition, an inclined surface 93 inclining downward toward the outer circumferential side of the swivel assembly is formed on the outer circumferential part 32 of the set plate 3. The ball 61 contacts the inclined surfaces 93 and 94 closely, thus placing the upper plate 2 at the predetermined position without the upper plate 2 being loosened horizontally and vertically.

12th Embodiment

Figure 18:
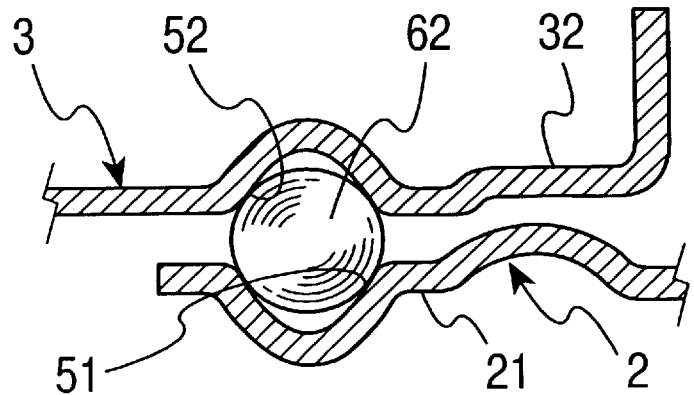
FIG. 18 is a main portion-depicted sectional view showing a swivel assembly according to a twelfth embodiment of the present invention.

As shown in FIG. 18, both inner surfaces of each of the sectionally V-shaped guide grooves 51 and 52 of the swivel assembly of the first embodiment are curved in conformity to the curved surface of the ball 62 to fit the ball 62 on both inner surfaces of each of the guide grooves 51 and 52.

13th Embodiment

Figure 19:
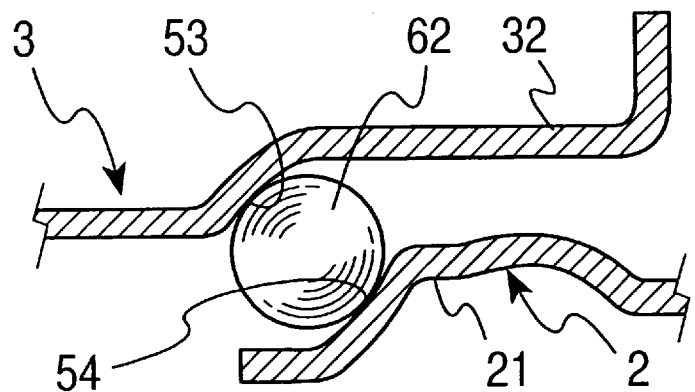
FIG. 19 is a main portion-depicted sectional view showing a swivel assembly according to a thirteenth embodiment of the present invention.

As shown in FIG. 19, the inclined surfaces 53 and 54 of the swivel assembly of the sixth embodiment are curved in conformity to the curved surface of the ball 62 to fit the ball 62 on the inclined surfaces 53 and 54.

14th Embodiment

Figure 20:
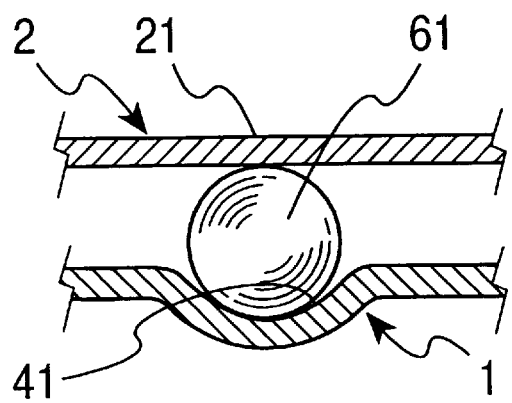
FIG. 20 is a main portion-depicted sectional view showing a swivel assembly according to a fourteenth embodiment of the present invention.

The guide groove 41 or the guide groove 42 circular-arc in section may not be formed on the lower plate 1 or on the upper plate 2 to make the lower plate 1 or the upper plate 2 flat, as shown in FIG. 20.

15th Embodiment

Figure 21:
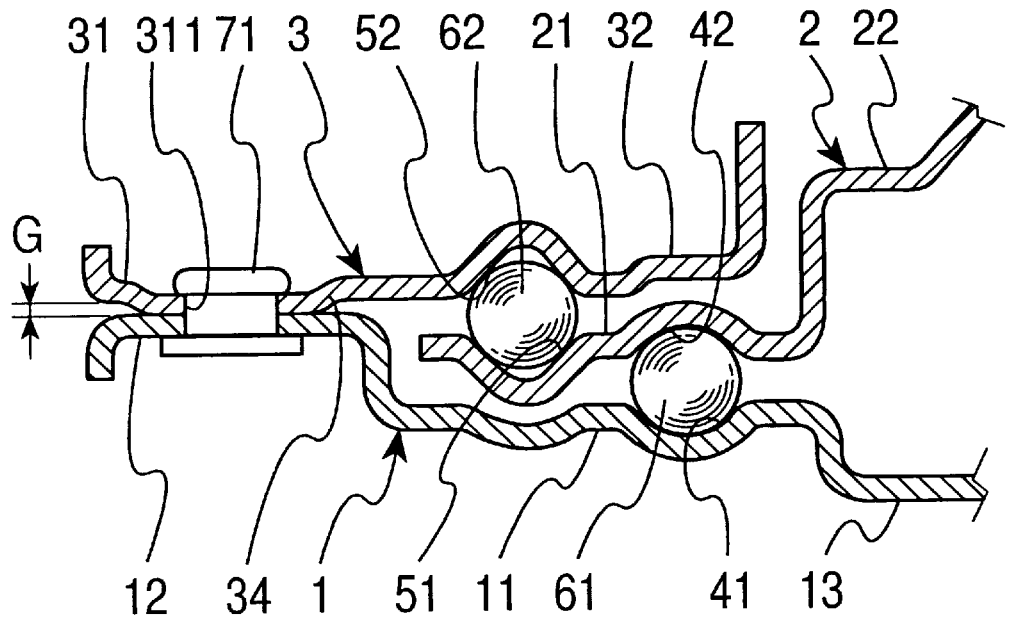
FIG. 21 is a sectional view showing a swivel assembly according to a fifteenth embodiment of the present invention.

In the 15th embodiment, as shown in FIG. 21, immediately after the set plate 3 is formed by press molding, the periphery of a through-hole 311, of the inner circumferential part 31, into which a caulking pin 71 is inserted is formed as a circular boss 34 projecting downward and having a predetermined height (G). The presence of the boss 34 increases the distance between the intermediate part 11 of the lower plate 1 and the outer circumferential part 32 of the set plate 3. Therefore, the ball 61 is hardly subjected to a force applied by the lower plate 1 and the upper plate 2, and the ball 62 is hardly subjected to a force applied by the upper plate 2 and the set plate 3.

Figure 22:
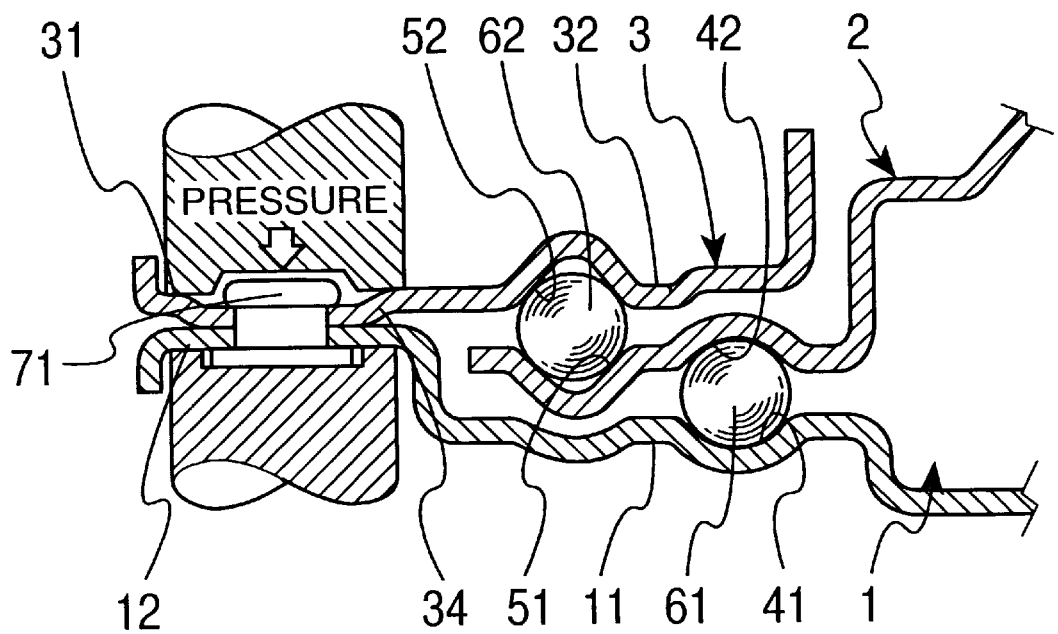
FIG. 22 is a main portion-depicted sectional view showing the swivel assembly of the 15th embodiment in which a swivel torque is altered.
Figure 23:
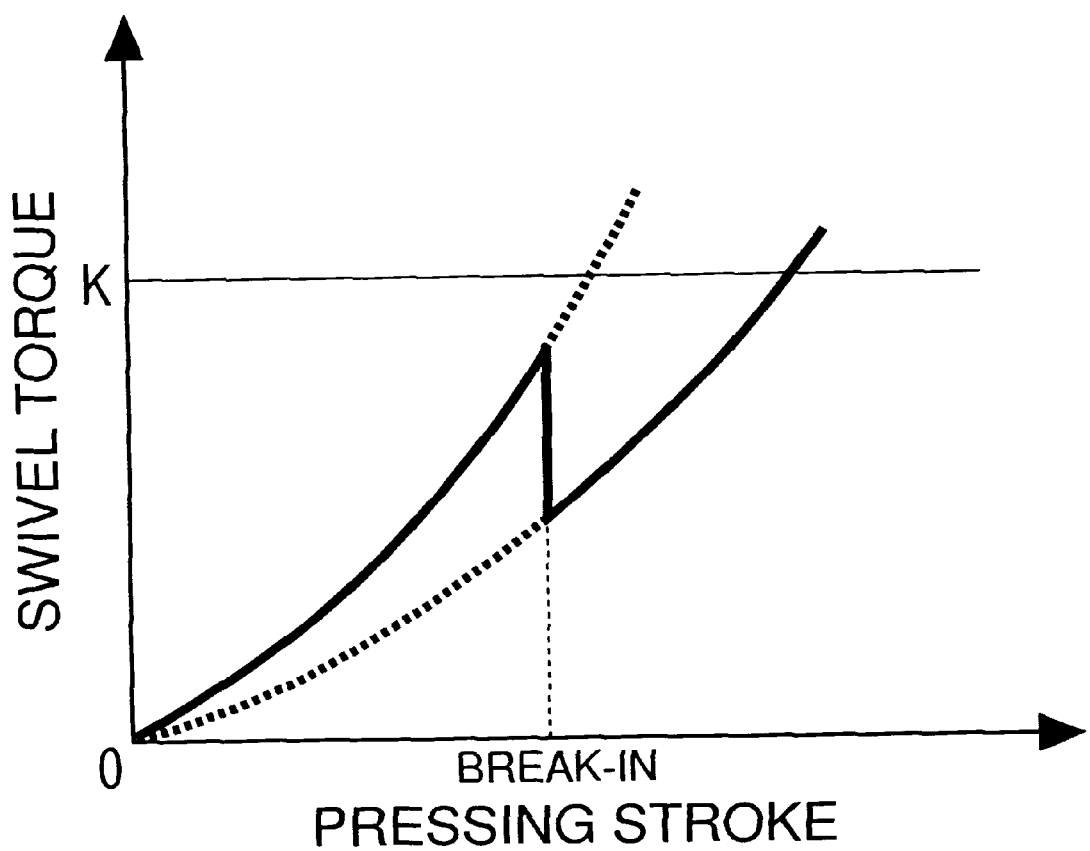
FIG. 23 is a graph showing the change of the swivel torque with respect to a pressing stroke in the 15th embodiment.

As shown in FIG. 22, in order to plastically deform the boss 34, the boss 34 is pressed and gradually to crush it while the swivel torque of the upper plate 2 is being measured. The process of pressing the boss 34 is described below with reference to FIG. 23. When the deformation of the boss 34 starts and the height thereof starts to be reduced as a result of the pressing, namely, as a result of increase of pressing stroke, the interval between the intermediate part 11 of the lower plate 1 and the outer circumferential part 32 of the set plate 3 becomes smaller gradually. Consequently, the swivel torque of the upper plate 2 becomes greater. The upper plate 2 is swiveled about five times for break-in when the boss 34 has been pressed at a predetermined stroke. As a result, the ball 61 fits the guide grooves 41 and 42, and the ball 62 fits the guide grooves 51 and 52. Thus, the swivel torque decreases; When the pressing stroke is increased thereafter, the swivel torque increases. When the swivel torque has reached an appropriate value (K), the pressing of the boss 34 is stopped. The appropriate value (K) of the swivel torque can be set freely although it is different according to the type of the vehicle seat.

In this manner, the swivel operation torque of the seat can be set to an appropriate value by adjusting the amount of the plastic deformation of the boss 34, even though the lower plate 1, the upper plate 2 or the set plate 3 has an error due to size variations in a press molding process. Further, the torque adjustment can be made after the lower plate 1 and the set plate 3 are connected to each other. Thus, it does not occur that a person is required to look for them in combining them with each other. The boss 34 may be formed on the lower plate 1. The caulking pin 71 may be replaced with a bolt and nut or spot welding.

16th Embodiment

Figure 24:
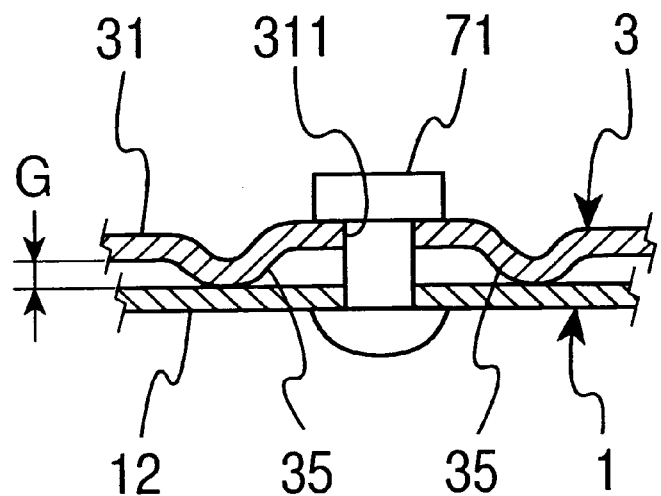
FIG. 24 is a sectional view showing a caulking portion of a swivel assembly of a 16th embodiment.

In the 16th embodiment, as shown in FIG. 24, a ring-shaped downward projection 35 having a predetermined height (G) is formed in the cross-sectional shape of a mountain in the periphery of a through-hole 311, of the inner circumferential part 31, into which the caulking pin 71 is inserted. The projection 35 is pressed gradually to plastically deform it. As a result, the interval between the lower plate 1 and the set plate 3 is adjusted to set the force of holding the upper plate 2 between the lower plate 1 and the set plate 3, namely, the swivel torque of the seat to an appropriate one. In the 16th embodiment, the projection 35 and the caulking pin 71 are pressed gradually to plastically deform them so as to connect the lower plate 1 and the set plate 3 to each other and adjust the interval between the lower plate 1 and the set plate 3. The construction of the 16th embodiment allows the swivel operation torque of the seat to be adjusted simultaneously with the connection of the lower plate 1 and the set plate 3, in addition to the effect of the 15th embodiment.

17th Embodiment

Figure 25:
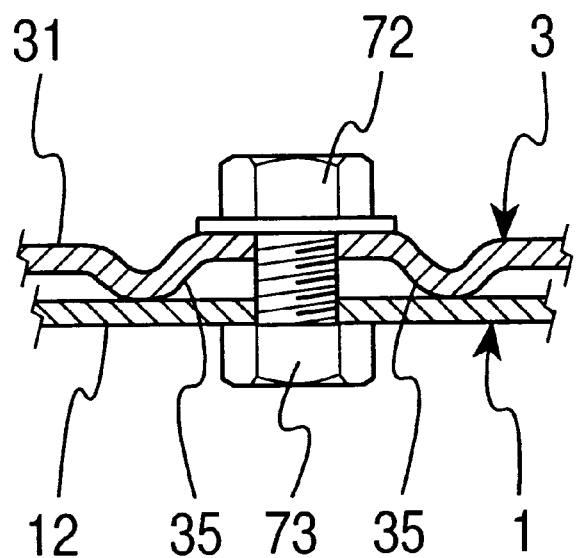
FIG. 25 is a sectional view showing a bolt connection portion of a swivel assembly of a 17th embodiment.

It is possible to connect the lower plate 1 and the set plate 3 with each other by means of a bolt 72 and a nut 73 instead of the caulking pin 71 used in the 16th embodiment, as shown in FIG. 25. In this case, it is necessary to connect the lower plate 1 and the set plate 3 with each other after the projection 35 is deformed plastically.

18th Embodiment

Figure 26:
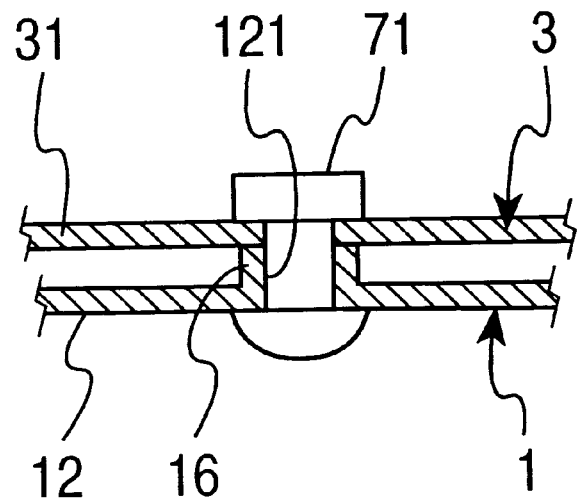
FIG. 26 is a sectional view showing a caulking portion of a swivel assembly of a 18th embodiment.

In the 18th embodiment, as shown in FIG. 26, a cylindrical collar wall 16 having a predetermined height is formed in the periphery of a through-hole 121, of the inner circumferential part 12 of the lower plate 1, into which the caulking pin 71 is inserted. The collar wall 16 and the caulking pin 71 are pressed gradually to plastically deform them so as to connect the lower plate 1 and the set plate 3 to each other and adjust the interval between the lower plate 1 and the set plate 3. The construction of this embodiment provides effect similar to that of the 16th embodiment.

19th Embodiment

Figure 27:
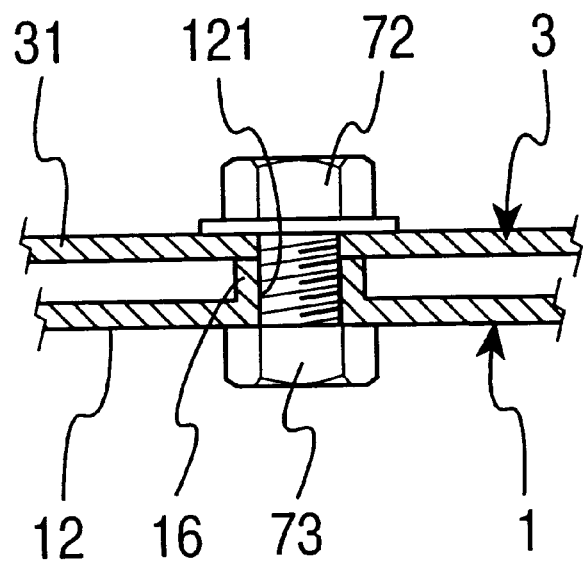
FIG. 27 is a sectional view showing a bolt connection portion of a swivel assembly of a 19th embodiment.

It is possible to connect the lower plate 1 and the set plate 3 with each other by means of a bolt 72 and a nut 73 instead of the caulking pin 71 used in the 18th embodiment, as shown in FIG. 27. In this case, it is necessary to connect the lower plate 1 and the set plate 3 with each other after the collar wall 16 is deformed plastically.

20th Embodiment

Figure 28:
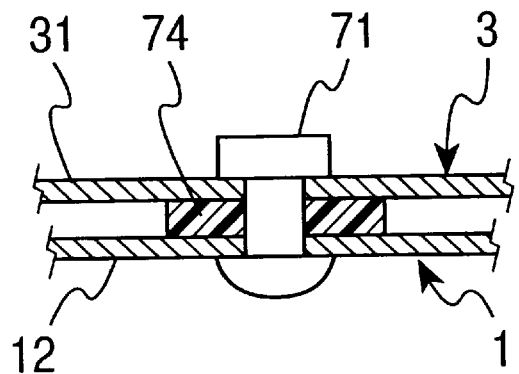
FIG. 28 is a sectional view showing a caulking connection portion of a swivel assembly of a 20th embodiment.

As shown in FIG. 28, a resinous plate 74 is inserted between the lower plate 1 and the set plate 3 at the portion into which the caulking pin 71 is inserted. The resinous plate 74 and the caulking pin 71 are pressed gradually to plastically deform them so as to connect the lower plate 1 and the set plate 3 to each other and adjust the interval between the lower plate 1 and the set plate 3. The construction of this embodiment provides effect similar to that of the 16th embodiment.

21st Embodiment

Figure 29:
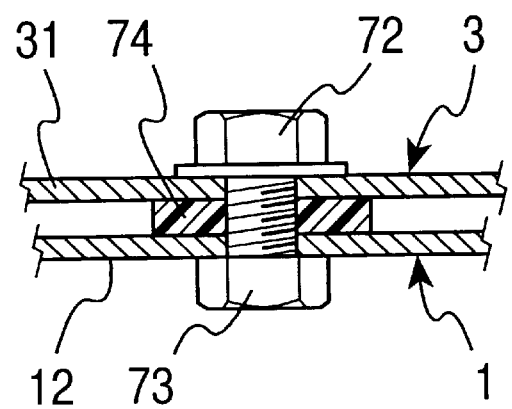
FIG. 29 is a sectional view showing a bolt connection portion of a swivel assembly of a 21th embodiment.

As shown in FIG. 29, it is possible to connect the lower plate 1 and the set plate 3 with each other by means of a bolt 72 and a nut 73 instead of the caulking pin 71 used in the 20th embodiment.

22nd Embodiment

Figure 30:
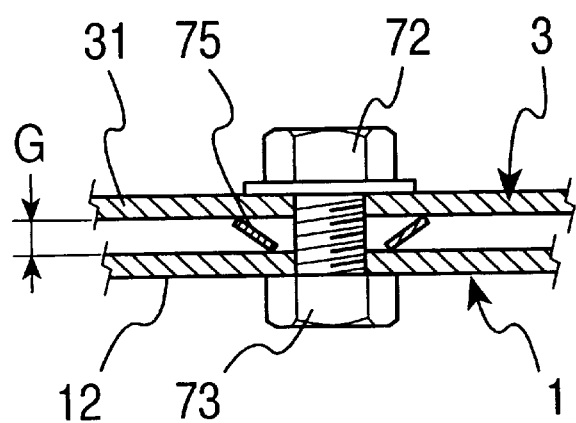
FIG. 30 is a sectional view showing a bolt connection portion of a swivel assembly of a 22th embodiment.

As shown in FIG. 30, a Belleville spring 75 having a predetermined height (G) is inserted between the lower plate 1 and the set plate 3 at the portion into which the bolt 72 is inserted. The interval between the lower plate 1 and the set plate 3 is adjusted by compressing the Belleville spring 75 by means of the bolt 72 and the nut 73. The construction of the 22nd embodiment provides effect similar to that of the 16th embodiment.

23rd Embodiment

Figure 31:
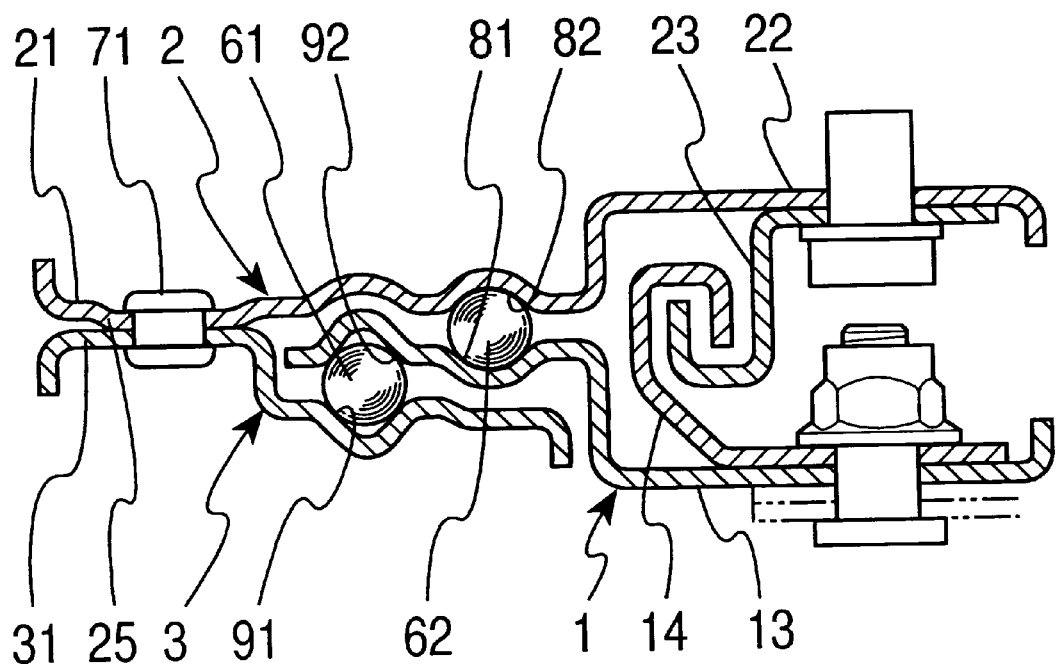
FIG. 31 is a main portion-depicted sectional view showing a swivel assembly according to a 23rd embodiment of the present invention.
Figure 32:
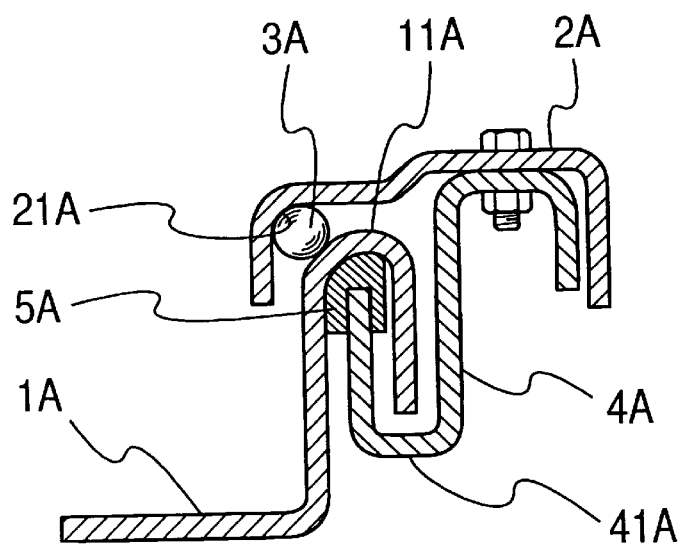
FIG. 32 is a main portion-depicted sectional view showing a conventional swivel assembly.
Figure 33:
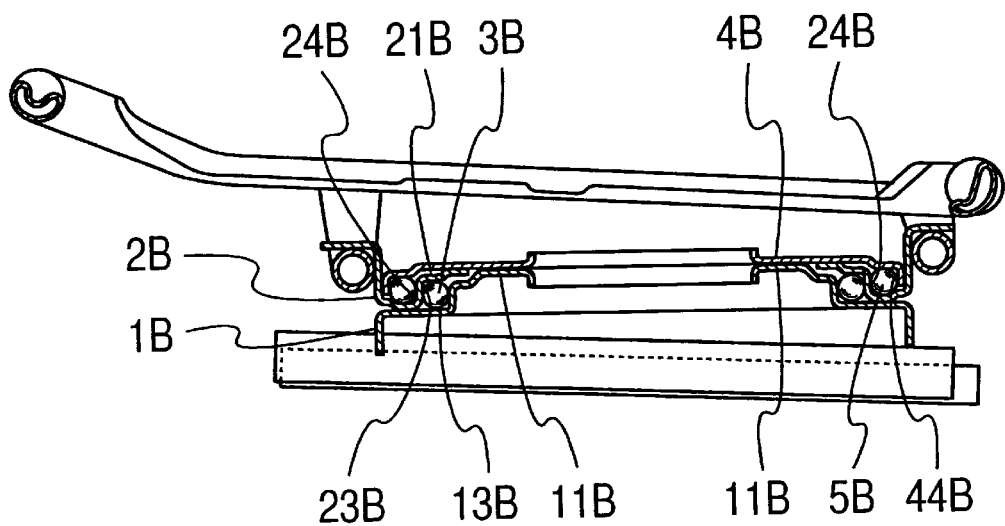
FIG. 33 is a partial cross-sectional side view showing a conventional swivel assembly.

The construction of the swivel assembly of the 23rd embodiment is basically the same as that of the ninth embodiment. That is, as shown in FIG. 31, the lower plate 1 is held between the upper plate 2 and the set plate 3 connected therewith through the balls 61 and 62. Similarly to the 15th embodiment, as an interval-altering portion, a boss 25 is formed on the upper plate 2 connected with the set plate 3 by the caulking pin 71.

OTHER EMBODIMENTS

In the 15th through 23rd embodiments, the ball 61,62 are interposed between the plates 1,2,3. Instead, it is possible to adopt a construction in which the plates are rotated slidably without resistance-reducing members; a construction in which parts made of synthetic resin are provided instead of balls; and a construction in which projection is formed on each plate and the projection is rotated in sliding contact with a confronting plate. Further, the projection, the collar wall, the resinous plate or the Belleville spring of the 16th through 22nd embodiments may be used as the interval-altering portion of the 23rd embodiment for altering the interval between the upper plate 2 and the set plate 3.

What is claimed is:

1. A swivel assembly for a vehicle seat comprising:
   a ring-shaped upper plate adapted to be fixed to a seat side member of a vehicle;
   a ring-shaped lower plate adapted to be fixed to a floor side member of the vehicle;
   a set plate disposed on an opposite side of the upper plate from the lower plate;
   a first resistance-reducing member interposed between the upper plate and the lower plate for reducing frictional resistance between the upper plate and the lower plate; and
   a second resistance-reducing member interposed between the upper plate and the set plate for reducing frictional resistance between the upper plate and the set plate;
   wherein the first resistance-reducing member is spaced outwardly of the second resistance-reducing member in a radial direction of the swivel assembly so that the first resistance-reducing member positioned at a seat load-applied side of the assembly receives a load of a seat which is applied from the upper plate; and the second resistance-reducing member places the upper plate at a predetermined position without requiring the upper plate to be loosened.

2. The swivel assembly according to claim 1, wherein when the upper plate is held between the lower plate and the set plate through the first resistance-reducing member and the second resistance-reducing member, the first resistance-reducing member and the second resistance-reducing member contact the upper plate at a predetermined pressure, respectively.

3. The swivel assembly according to claim 1, wherein the second resistance-reducing member contacts an inclined surface formed on at least one of the upper plate and the set plate and inclined in a radial direction thereof.

4. The swivel assembly according to claim 3, wherein the inclined surface is formed on both surfaces of a V-shaped groove.

5. A swivel assembly for a vehicle seat comprising:
   a ring-shaped upper plate adapted to be fixed to a seat side member of a vehicle;
   a ring-shaped lower plate adapted to be fixed to a floor side member of the vehicle;

a set plate disposed to permit one of: the upper plate being held between the set plate and the lower plates and the lower plate being held between the set plate and the upper plate;

a first resistance-reducing member interposed between the upper plate and the lower plate for reducing frictional resistance between the upper plate and the lower plate; and a second resistance-reducing member interposed between the set plate and one of the upper plate and the lower plate for reducing frictional resistance therebetween;

wherein the first resistance-reducing member is spaced outwardly of the second resistance-reducing member in a radial direction of the swivel assembly so that the first resistance-reducing member positioned at a seat load-applied side of the assembly receives a load of a seat which is applied from the upper plate; and the second resistance-reducing member places the upper plate at a predetermined position without requiring the upper plate to be loosened.

6. The swivel assembly according to claim 5, wherein when the upper plate is held between the lower plate and the set plate through the first resistance-reducing member and the second resistance-reducing member, the first resistance-reducing member and the second resistance-reducing member contacting the upper plate at a predetermined pressure, respectively.

7. The swivel assembly according to claim 5, wherein when the lower plate is held between the upper plate and the set plate through the first resistance-reducing member and the second resistance-reducing member, the first resistance-reducing member and the second resistance-reducing member contact the lower plate at a predetermined pressure, respectively.

8. The swivel assembly according to claim 5, wherein the second resistance-reducing member is fixed to one of the upper plate or the set plate and reduces the frictional resistance of each of the upper plate and the set plate.

9. The swivel assembly according to claim 5, wherein the second resistance-reducing member is fixed to one of the lower plate or the set plate and reduces the frictional resistance of each of the upper plate and the set plate.

10. The swivel assembly according to claim 5, wherein the second resistance-reducing member contacts an inclined surface formed on at least one of the upper plate and the set plate and inclined in a radial direction thereof.

11. The swivel assembly according to claim 5, wherein the second resistance-reducing member contacts an inclined surface formed on the set plate and inclined in a radial direction of the set plate.

12. The swivel assembly according to claim 10 or claim 11, wherein the inclined surface is formed on both surfaces of a V-shaped groove.

13. The swivel assembly according to claim 5, wherein an interval-altering part for adjustably altering an interval between the lower plate and the set plate when the interval-altering part is deformed is formed at a connection portion connecting the lower plate and the set plate with each other.

14. The swivel assembly according to claim 5, wherein an interval-altering part for adjustably altering an interval between the upper plate and the set plate when the interval-altering part is deformed is formed at a connection portion connecting the upper plate and the set plate with each other.

15. The swivel assembly according to claim 13 or claim 14, wherein the interval-altering part is plastically deformed.

16. The swivel assembly according to claim 13 or 14, wherein the interval-altering part is elastically deformed.

* * * * *